United States Patent [19]
Ishii et al.

[11] 3,916,798
[45] Nov. 4, 1975

[54] GUIDING SYSTEM FOR A COMPUTER CONTROLLED VEHICLE

[75] Inventors: Takemochi Ishii; Masakazu Iguchi; Masaki Koshi, all of Tokyo, Japan

[73] Assignee: Japan Society for the Promotion of Machine Industry, Tokyo, Japan

[22] Filed: July 17, 1974

[21] Appl. No.: 489,452

Related U.S. Application Data

[63] Continuation-in-part of Ser. No. 280,838, Aug. 15, 1972, Pat. No. 3,844,224.

[30] Foreign Application Priority Data

| Aug. 19, 1971 | Japan | 46-62587 |
| Aug. 19, 1971 | Japan | 46-62588 |
| Aug. 19, 1971 | Japan | 46-62589 |

[52] U.S. Cl. ............ 104/247; 104/139; 180/79
[51] Int. Cl.² ............................................. B61F 9/00
[58] Field of Search ........ 104/242, 243, 244.1, 245, 104/246, 247, 105, 130, 139, 140; 180/79

[56] References Cited
UNITED STATES PATENTS

| 3,098,454 | 7/1963 | Maestrelli | 104/244.1 X |
| 3,628,462 | 12/1971 | Holt | 104/130 X |
| 3,782,292 | 1/1974 | Metcalf | 104/130 |
| 3,791,308 | 2/1974 | Hartz | 104/139 |
| 3,822,648 | 7/1974 | Ishii et al. | 104/245 |

FOREIGN PATENTS OR APPLICATIONS

| 1,116,081 | 10/1961 | Germany | 104/244.1 |

*Primary Examiner*—M. Henson Wood, Jr.
*Assistant Examiner*—Randolph A. Reese
*Attorney, Agent, or Firm*—Lane, Aitken, Dunner & Ziems

[57] ABSTRACT

In a guide system for a computer controlled vehicle including a flat guideway or track and a sunken guide channel provided beneath the track, there is provided, in combination with at least two guide wheels which are mounted horizontally on a vertical steering guide link for engagement with vertical guide walls of the guide channel, a guide follower means for assisting the guide wheels in guiding the vehicle along a selected track at an intersection or a diverting point of tracks, by engagement with guide reference means which is provided within the guide channel.

4 Claims, 2 Drawing Figures

GUIDING SYSTEM FOR A COMPUTER CONTROLLED VEHICLE

BACKGROUND OF THE INVENTION:

This application is continuation-in-part of our copending application Ser. No. 280,838 filed on Aug. 15, 1972 now U.S. Pat. No. 3,844,224 for A GUIDE SYSTEM FOR A COMPUTER CONTROLLED VEHICLE.

This application relates to a guide system for guiding under control of a computer a tire-wheeled vehicle along a selected route within a traffic network containing intersections, junctions and diverting points of main and branch tracks.

In recent years extensive research has been devoted to the control of transportation of vehicles in a prepared traffic network, with use of a simplified computer control logic and selecting mechanism which are associated with a steering mechanism of the vehicle for effecting quick switching of a vehicle from one track to another at intersections and diverting points.

In a traffic system of the nature just mentioned, it is important to ensure smooth travel of a vehicle or a train of vehicles along a selected route through intersections and diverting points, by means of a guide system which includes means for directing the vehicle toward the selected track in response to a control signal from the computer. In this connection, it is known to provide a continuous sunken guide channel beneath and coextensively with the tracks on which the vehicles run, in combination with a guide wheel or wheels mounted on a vertical axle which has one end connected to a steering mechanism of the vehicle and the other end extended into the sunken guide channel The guide wheels on the verticle axle are held in engagement with vertically extending side walls of the sunken guide channel for controlling lateral movement of the vehicle running along a straight line. The upper surface of the sunken guide channel is generally covered by a rigid wall structure to provide a flat travel surface for the vehicles, except for a longitudinal center slit receiving the vertical axle which carries the guide wheels. However, the known guide system just mentioned is not capable of performing switching operation for diverting a vehicle from one track to another and presents various difficulties in guiding the vehicles through intersections, junctions and diverting points due to surface obstructions and/or outer disturbances such as strong winds acting on the vehicle body in a lateral direction.

SUMMARY OF THE INVENTION:

It is an object of the present invention to provide a guide system for a vehicle supported on tire wheels and travelling along a predetermined route in a prepared traffic network of main and branch tracks under control of a computer.

It is another object of the present invention to provide a guide system for a vehicle of the nature as mentioned above, the guide system employing reference guide means fixedly located in a sunken guide channel beneath the main and branch tracks and having two opposing guide surfaces, for cooperation with guide follower means which is adapted to selectively engage one of the guide surfaces of the reference guide means in a manner to effect controlled steering of the vehicle at a track intersection or junction.

It is a further object of the present invention to provide a guide system for a vehicle of the nature as mentioned above, the guide system employing guide reference means in the form of two guide rails parallelly located within the sunken guide channel on opposite sides of the center line thereof and having two opposing guide surfaces, and guide follower means in the form of pair of follower rollers engageable with the guide surfaces of the reference guide means to effect controlled steering at a track junction or intersection.

It is a still further object of the present invention to provide a guide system for a vehicle of the nature as mentioned above, the guide system employing a pair of follower rollers on opposite ends of a horizontally located rotary shaft in positions angularly displaced from each other by a predetermined angle, the rotary shaft being capable of rotating through the predetermined angle to selectively bring one of the follower rollers into engagement with one of the guide surfaces of the reference guide means to ensure controlled steering of the vehicle at junctions, intersections and diverting points of the tracks.

It is a further object of the present invention to provide a guide system for a vehicle of the nature as mentioned above, which is simple in construction and reliable in operation.

According to the invention, in order to guide the vehicles smoothly through an intersection or to divert the vehicles from one track to another, there are provided, in combination with a guide channel extending along and beneath the center line of a track and having a flat surface covering means with a longitudinal slit coextensive with the length of the track for receiving a steering guide link which is connected to a steering mechanism of the vehicle and which carries at least two guide wheels for engagement with either one of guide surfaces on the opposed vertical side walls of the guide channel, a guide follower means provided at the lower end of the steering guide link for engagement selectively with one of reference rail surfaces facing opposite side walls of the guide channel, thereby to effect controlled steering of the vehicle at intersections, diverting points and junctions of the tracks with suitable stability.

In a particular form of the invention, the guide system of the invention includes reference guide rails fixedly located on opposite sides of the center lines of the sunken guide channels and having vertical guide surfaces in face-to-face relation with vertical side walls of the sunken guide channels, and guide follower means including a rotary shaft mounted transversely on a steering guide link and rotatable through 90°, a pair of guide follower rollers mounted at opposite ends of the rotary spindle in positions 90° offset from each other, and means for rotating the rotary spindle through 90° for moving the guide follower rollers selectively into and out of engagement with the vertical guide surfaces of the reference guide rails in response to a control signal.

BRIEF DESCRIPTION OF THE DRAWINGS:

The above and other objects, features and advantages of the invention will become clear from the following description and appended claims, taken in conjunction with the accompanying drawings which show by way of example preferred embodiments of the instant invention and wherein:

DESCRIPTION OF THE PREFERRED EMBODIMENT

Figure 1:
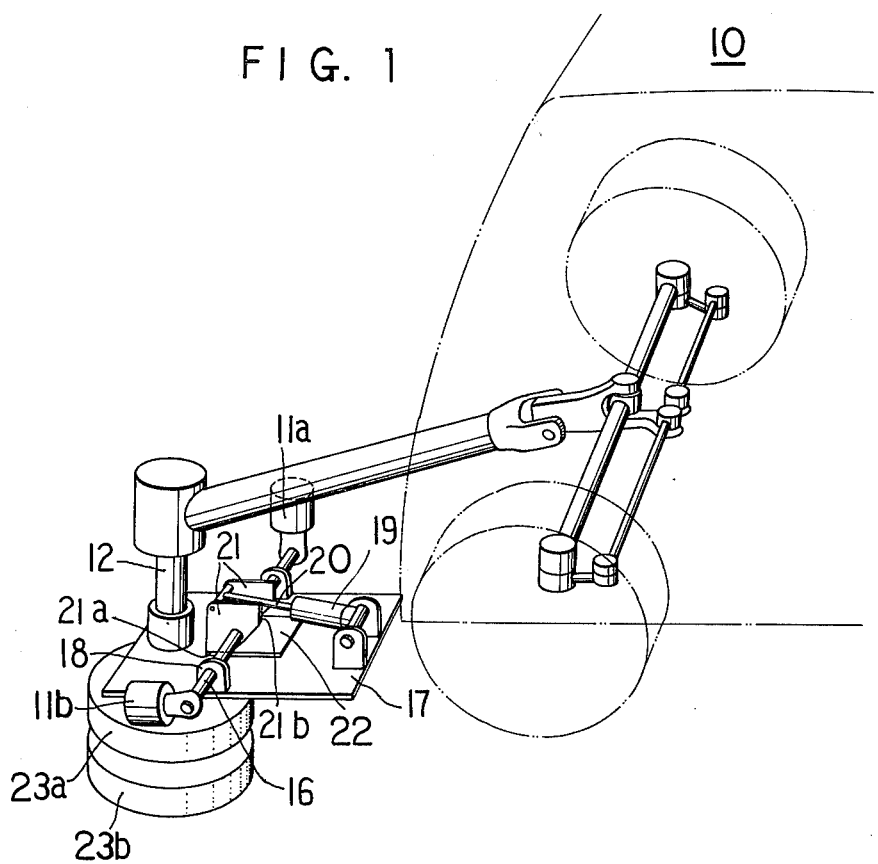
FIG. 1 is a perspective view showing a further modification of the guide system according to the present invention.
Figure 2:
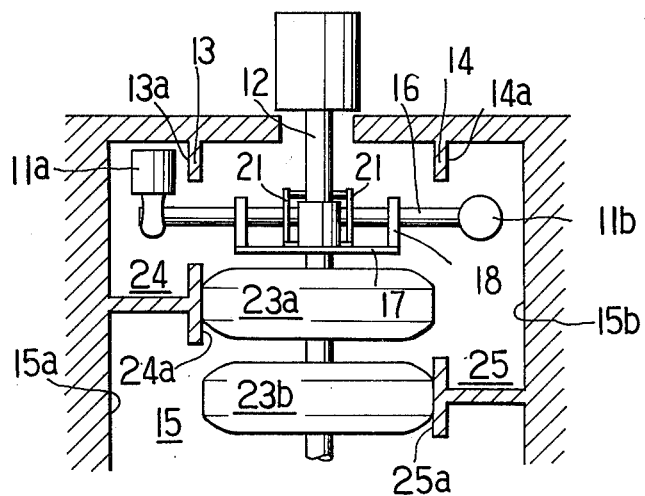
FIG. 2 is a diagrammatic sectional view showing the guide system of FIG. 1 as disposed within a sunken guide channel beneath the vehicle track.

FIGS. 1 and 2 show guide system according to the present invention, wherein a guide follower means in the form a pair of follower rollers 11a and 11b are mounted on a straight steering guide link 12 of a vehicle 10, for cooperation with reference guide rails 13 and 14 which have vertical guide surfaces 13a and 14a in face-to-face relation with opposing side walls 15a and 15b of a sunken guide channel 15. The guide follower rollers 11a and 11b are mounted at opposite ends of a rotary shaft 16 which is supported on the steering guide link 12 by means of a bracket 17. The guide follower rollers 11a and 11b are rotatably held in positions which are displaced 90 degrees in phase from each other. The rotary shaft 16 is horizontally supported in bearings 18 of the bracket 17 and rotatable about its longitudinal axis through a predetermiend angle, for example, through 90° in the particular embodiment shown, for selectively bringing one of the guide follower rollers 11a and 11b into engagement with the vertical guide surface of the reference guide rail 13 or 14.

In order to impart rotational movement to the rotary shaft 16, a fluid-actuated piston-cylinder device 19 is rotatably mounted on brackets 17 and linked to arms 21 of the rotary shaft 16 by means of a piston rod 10. The rotary movement of the shaft 16 is limited to the afore-mentioned predetermined angle by the engagement of front edges 21a or back edges 21b of the arms 21 with a stopper member 22.

In the embodiment shown in FIGS. 1 and 2, main guide wheels 23a and 23b are adapted to engage vertical guide surfaces 24a and 25a of main guide rails 24 and 25 which are fixedly located on the opposing side walls 15a and 15b of the sunken guide channel 15. When it is desired to direct the vehicle 10 toward a track diverting, for example, to the right of a track along which the vehicle has been travelling, the main guide wheel 23a is usually pressed against the guide surface 24a of the main guide rail 24 which leads to the diverting track. However, during the switching operation, the vehicle 10 sometimes loses stability due to outer disturbances such as strong winds acting on the vehicle body in a transverse direction, forcing the main guide wheel 23a to disengage from the guide surface 24a of the main guide rail 24. This can be suitably avoided in the present invention as the follower roller 11a is urged into engagement with the vertical guide surface 13a of the reference guide rail 13 at the switching point to ensure controlled steering of the vehicle 10 during the diverting operation. The vehicle 10 can also be switched to the left with stability in a similar manner by actuating the piston-cylinder device 19 to rotate the rotary shaft 16 in a reverse direction through 90 degrees to bring the opposite follower roller 11b into engagement with the vertical guide surface 14a of the reference guide rail 14.

It will be understood that the embodiments shown and described herein are purely illustrative and that various modifications and changes may be made therein without departing from the spirit and scope of the invention as set forth in the appended claims.

What is claimed is:

1. A guide system for a vehicle supported on wheels and travelling along a predetermined route in a traffic network of main and branch tracks under control of a computer, said system comprising:

guide channels generally of a rectangular cross-section and extending along the center lines of said tracks below the upper surfaces thereof;

reference guide rails fixedly located on opposite sides of center lines of said guide channels and having opposing guide surfaces in face-to-face relation with vertical side walls of said guide channels;

a steering guide link connected to the steering mechanism of said vehicle and extending into said guide channels;

a pair of horizontally revolving guide wheels mounted on said steering guide link for engagement with opposing vertical guide surfaces on said side walls of said guide channels;

guide follower means including a rotary shaft mounted on said steering guide link and rotatable through a predetermined angle, and a pair of follower rollers mounted at opposite ends of said rotary shaft in angularly offset positions and adapted to engage selectively said guide surfaces of said reference guide rails in a manner to effect controlled steering of said vehicle; and means for rotating said rotary shaft through said predetermined angle for moving said follower rollers into and out of engagement with said guide surfaces of said reference guide rails in response to a control signal.

2. A guide system as set forth in claim 1, further comprising a stopper member for restricting rotational movement of said spindle to said predetermined angle, and wherein said means for rotating said supporting spindle comprises a fluid-actuated piston-cylinder device operatively connected to said rotary shaft for imparting rotational movement thereto.

3. A guide system as set forth in claim 1, wherein said rotary shaft is rotatable through 90° and said pair of follower rollers are held in positions 90° offset from each other.

4. A guide system as set forth in claim 1, wherein said opposing side walls of said guide channel includes longitudinally extending and inwardly projecting guide rails having vertical guide surfaces for engagement with said horizontally revolving guide wheels on said steering guide link.

* * * * *